T. A. SOMDAL.
OPTICAL INSTRUMENT.
APPLICATION FILED JAN. 20, 1910.

971,798.

Patented Oct. 4, 1910.

Witnesses.
Pearl Coleman.
S. A. Troxell.

Inventor.
Truls A. Somdal.
By Atty N. DuBois.

THE NORRIS PETERS CO., WASHINGTON, D. C.

UNITED STATES PATENT OFFICE.

TRULS A. SOMDAL, OF SPRINGFIELD, ILLINOIS.

OPTICAL INSTRUMENT.

971,798. Specification of Letters Patent. Patented Oct. 4, 1910.

Application filed January 20, 1910. Serial No. 539,008.

*To all whom it may concern:*

Be it known that I, TRULS A. SOMDAL, a citizen of the United States, residing at Springfield, in the county of Sangamon and State of Illinois, have invented a new and useful Optical Instrument, of which the following is such a full, clear, and exact description as will enable others skilled in the art to which it appertains to make and use my said invention.

This invention relates particularly to magnifying glasses, or eye glasses, such as are used by watch makers, jewelers, etc. But it obviously may be embodied in reading glasses, cameras, or other instruments, within the scope of my invention.

The purpose of my invention is to provide an instrument having two lenses, one of which is stationary and the other is movable, so that merely by changing the position of the frame, and without any manipulation of the lenses themselves, a single lens or both lenses may be brought into focus.

With this end in view my invention comprises means for connecting the second or movable lens with the shell or frame or holder, so that the movable lens will gravitate into position for use, or out of position, upon slight movement of the main structure.

I herein illustrate and describe the invention as embodied in a jeweler's eye-glass.

Figure 1:
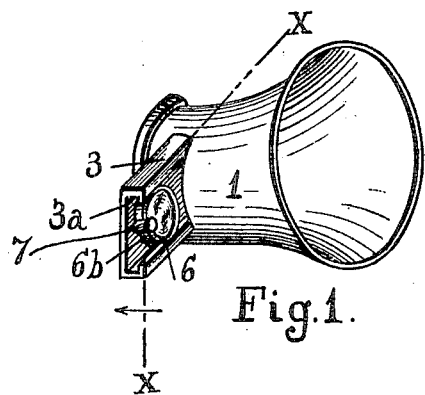
Figure 2:
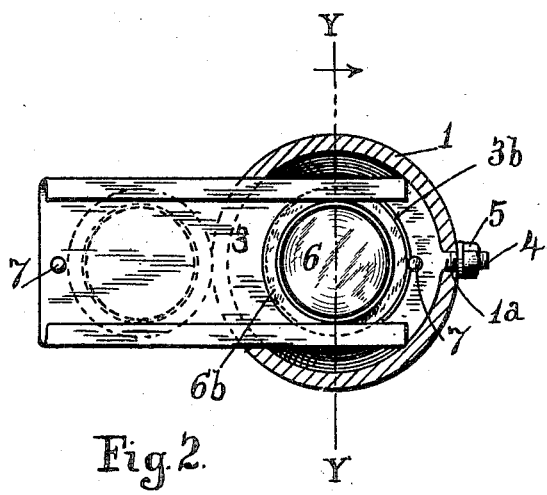
Figure 3:
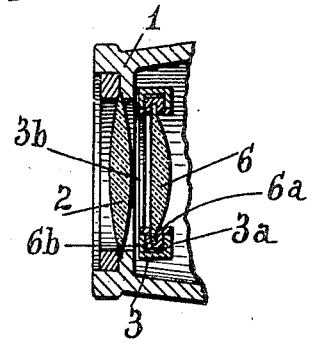

Figure 1 is a perspective view of the instrument; Fig. 2 is an enlarged vertical section on the line X. X. of Fig. 1; and Fig. 3 is a vertical section on the line Y. Y. of Fig. 2.

The frame or circular flaring shell 1, is of hard rubber or other suitable material. A lens 2 is secured in one end of the shell in the usual manner. A lens-support preferably in the form of a channel plate 3, is secured in the shell 1, at right angles to the axis of the shell. A screw 4, integral with the plate 3, projects through a hole 1$^a$ in the shell, and a nut 5 fitting on the screw, secures the plate against lengthwise movement. The plate 3 has lengthwise channels 3$^a$ accommodating the ring surrounding the circumferential flange of the lens 6. The rolling lens 6 is a circular disk of polished glass and has a circumferential flange 6$^a$. The lens 6 is preferably mounted in a light metal ring 6$^b$ fitting around the flange 6$^a$. The ring 6$^b$ serves to prevent the inner face of the disk 6 from rubbing on the plate 3, but it is obvious that the protective ring may be formed integral with the disk, or may be dispensed with, without departure from my invention.

Pins 7 extending outwardly from the face of the plate 3 serve to limit the movement of the lens 6. The plate 3 also has an opening 3$^b$, in line with the fixed lens 2.

The rim of the ring 6$^b$ rolls freely on the edges of the channel-members 3$^a$.

When the plate 3 occupies a slightly inclined position with the center of its outer end a little below the horizontal plane through the center of the lens 2, the lens 6 will roll outward on the plate 3 and assume the position shown by dotted lines in Fig. 2. If the outer end of the plate is elevated somewhat above the horizontal, the lens 6 will roll inward on the plate and stop in line with the fixed lens 2.

From the foregoing it will be seen that the lens 6 is adapted to gravitate into position with its axis in line with the axis of the lens 2; or to gravitate away from and completely uncover the lens 2.

The operation is as follows: Assume that the user has the shell in place over his left eye and wishes to use both lenses, he will simply incline his head somewhat to the right, and thereupon the lens 6 will roll into focus with the lens 2. If he wishes to use the lens 2 only, he will incline his head to the left, thereupon the lens 6 will roll out of focus and stop against the pin 7. By merely inclining his head to the right or left, as the case may be, the user may use both lenses, or one lens, at pleasure.

Having fully described my invention what I claim as new and desire to secure by Letters Patent is:

1. An instrument comprising a fixed lens, a support for said fixed lens, a movable lens adapted to gravitate into focus or out of focus with respect to said fixed lens, and a support for said movable lens.

2. An instrument comprising a fixed lens, a support for said fixed lens, a rolling lens adapted to cover or uncover said fixed lens, and a support for said rolling lens.

3. An instrument comprising a frame, a lens fixed on the frame, a lens support mounted on the frame, and a lens adapted to roll on said lens-support into focus with said fixed lens.

4. In an instrument of the class described, the combination of a frame, a lens fixed on said frame, a lens-support mounted on said frame at right angles to the axis of said fixed lens and having an opening in line with said lens, and a circular lens adapted to roll freely on said lens-support to cover, or uncover the opening in said lens-support.

5. An instrument comprising a frame, a lens fixed on the frame, a lens-support mounted on the frame at right angles to the axis of the fixed lens, a circular lens adapted to roll freely on the lens-support, and stops limiting the movement of said lens on said lens-support.

6. An instrument comprising a frame, a lens fixed on the frame, a lens-support mounted on the frame at right angles to the axis of the fixed lens, and having an opening in line with said lens, means for connecting said lens-support with said frame, and a lens adapted to roll on said lens-support to cover or uncover the opening in said lens-support.

7. In an instrument of the class described, the combination of a frame, a fixed lens mounted on the frame, a lens-support perpendicular to the axis of said fixed lens and having channel-members, a second lens mounted on said lens-support, and a ring surrounding said second lens and having a mounting provided with a rim adapted to roll on the edges of the channel-members of said lens-support.

In witness whereof I have hereunto signed my name at Springfield, Illinois, this 23rd day of December, 1909.

TRULS A. SOMDAL.

Witnesses:
W. S. TROXELL,
PEARL COLEMAN.